United States Patent
Veith

[15] 3,655,174
[45] Apr. 11, 1972

[54] AIR SEALING DEVICE FOR THE TRAVELING GRATES OF SINTERING MACHINES

[72] Inventor: Werner Veith, Frankfurt am Main, Germany

[73] Assignee: Dravo Corporation, Pittsburgh, Pa.

[22] Filed: Oct. 14, 1969

[21] Appl. No.: 866,318

[52] U.S. Cl. ............................................................266/21
[51] Int. Cl. ......................................................F27b 21/02
[58] Field of Search ...............................................266/21, 20

[56] References Cited

UNITED STATES PATENTS

| | | | |
|---|---|---|---|
| 2,853,289 | 9/1958 | Schofield | 266/21 |
| 2,982,533 | 5/1961 | Meyer et al. | 266/21 |
| 3,172,936 | 3/1965 | Koontz | 266/21 |
| 3,381,949 | 5/1968 | Rowen | 266/21 |

Primary Examiner—Gerald A. Dost
Attorney—Parmelee, Utzler & Welsh

[57] ABSTRACT

This invention relates to sintering apparatus of the type in which a series of pallets or traveling grates carrying the sintering mix passes over a succession of wind boxes with in which a sub-atmospheric pressure is maintained whereby hot gases or air is drawn down through the charge moving thereover and is for an improved seal between the pallets and wind boxes for apparatus of this kind. The improvement in said seal resides in the use of a replaceable, non-lubricated, sliding seal between opposite sides of the grate and the slide bars mounted upon the upper face of the wind boxes or the supports therefor with contact maintained by spring pressure. Thus the mounting of the sealing bars upon the grate is accessible when the sealing device is not seated upon the slide bars of the wind boxes. The grates are supported, upon opposite sides, by a wheel and axle mounted upon guide rails at opposite sides of the wind box openings.

1 Claim, 4 Drawing Figures

Patented April 11, 1972 3,655,174

INVENTOR.
WERNER VEITH

By Parmelee, Utzler & Walsh.
Attorneys

AIR SEALING DEVICE FOR THE TRAVELING GRATES OF SINTERING MACHINES

U.S. Pat. No. 2,861,792 granted Nov. 25, 1968 discloses sintering apparatus of the general class herein involved and provides spring plates mounted upon the side faces of the wind box supports for sliding contact with the grates moving thereover.

SUMMARY OF THE INVENTION

The invention is concerned with non-lubricated spring loaded sealing devices to be mounted upon the sides of traveling grates of a sintering mechanism for slidably engaging slide bars at opposite sides of the wind box openings for drawing air downwardly through the burning mixture upon the grates moving over successive wind box openings. Such sealing devices are mounted within downwardly facing openings of side brackets extending longitudinally of each side of the grate and are adapted to depend therefrom and to engage the adjacent top face of slide rails extending the length of each side of each wind box opening. The weight of the loaded grates is carried by laterally extending brackets mounting rotatable wheels supported upon suitable rails disposed in longitudinal spaced relation to the said loaded grates. Hence the spring loaded sealing devices carry none of the weight of the grates.

One object of the invention is to provide non-lubricated sliding spring loaded seals between the slide rails at each wind box opening and the depending grate seals of the moving loaded grates.

Another object of the invention is to provide means for adjustably mounting said sliding seals to maintain uniform bearing of the seals upon the wind box slide rails.

DETAILED DESCRIPTION OF THE INVENTION

Figure 1:
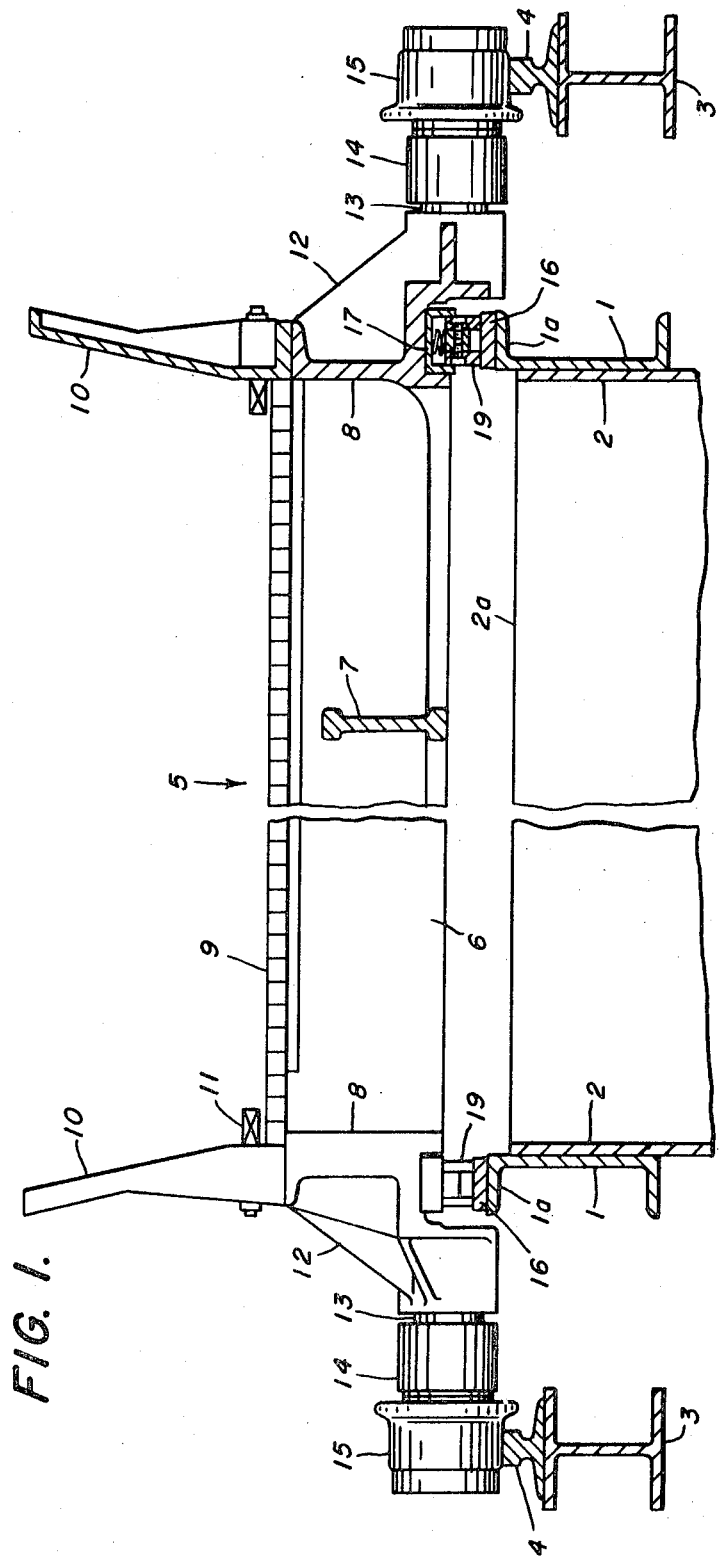
FIG. 1 shows an end elevation of a traveling grate, partly in cross-section, illustrating the lateral rolling support for the grates moving over an underlying wind box opening and the sliding grate seals engaging the top faces of the wind box opening.

Referring now in detail to FIG. 1 of the drawing, reference numeral 1 indicates, in cross-section, the usual side rails of a conventional type wind box having the usual sidewalls 2 and end walls 2a. Spaced outwardly of each said side rails 1 are suitably supported parallel rails 3 having on their top faces tracks 4 over which the grates 5 move, as hereinafter described. The grates 5 may be of any suitable construction and include end walls 6 connected by suitable spaced ribs 7 and side walls 8. Overlying the top faces of grate end walls 6 are suitable spaced grate bars 9 which may be secured in place by suitable means, such as the sidewalls 10 and suitable clamping members 11. Spaced longitudinally of each grate sidewall 8 are at least two suitable brackets 12 which may be integral therewith and each bracket receives a suitable outwardly extending shaft 13 fixed therein. Mounted upon each shaft 13 are a rotatable lift roller 14 and a rotatable wheel 15. The latter engaging the adjacent track 4 for supporting movement of the grates 5 thereover and across the open top face of the wind boxes 2.

Figure 4:
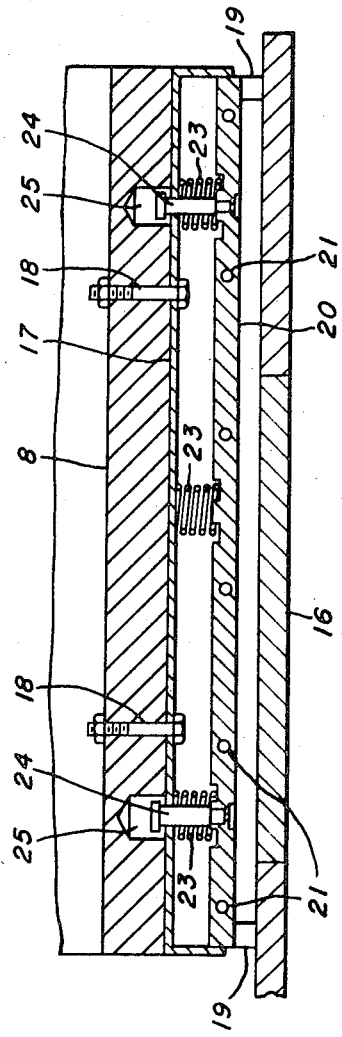
FIG. 4 shows a longitudinal section through the sliding seal of the grate and means for suspending such seal from the grate for resilient sliding contact with the underlying wind box slide rail.
Figure 2:
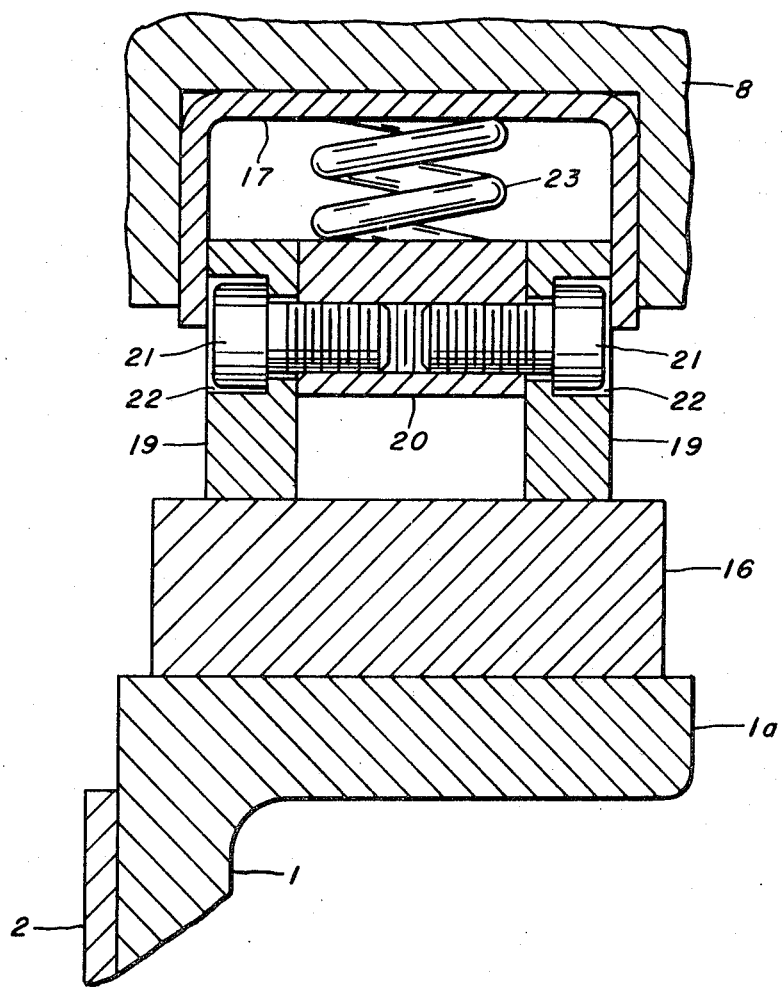
FIG. 2 shows in cross-section the mounting of the spring loaded seals upon the grates at each side thereof.

Overlying the top flange 1a of each wind box side rail 1 are suitable sliding seals between the wind box 2 and the grates 5 moving thereover. Mounted upon the top flange 1a of each wind box side rail 1 and extending longitudinally of the length of each wind box opening is a slide rail 16 secured in any suitable manner to said underlying flange 1a. Overlying each slide rail 16 in vertical spaced relation thereto and recessed into the adjacent bottom face of each grate sidewall 8 is a seal and guide member housing 17, as best shown in FIGS. 2 and 4. Such housing 17 comprises a bottom wall, connecting side and end walls and may be detachably secured within member 8 by any suitable means such as bolts 18, as best shown in FIG. 4 and extends the length of each grate side wall. Received within the open bottom face of member 17 are a pair of transversely spaced rectangular seal members 19, between which is disposed a spacing bar 20. Sealing members 19 and bar 20 are connected by a plurality of countersunk bolts 21. Bars 19 have recessed openings 22 receiving the heads of bolt 21. Overlying bar 20 are a plurality of coil springs 23 which maintain the bottom portions of sealing members 19 in resilient contact with slide bar 16 as the grate moves over the wind box openings upon slide bars 16. As best shown in FIG. 4, the spacing bar 20 is resiliently retained within housing 17 by means of spring loaded bolts 24, the heads of which are received in recessed openings 25 of member 8, by reason of seal housing member 17 being secured in fixed relation to grate members 8.

Figure 3:
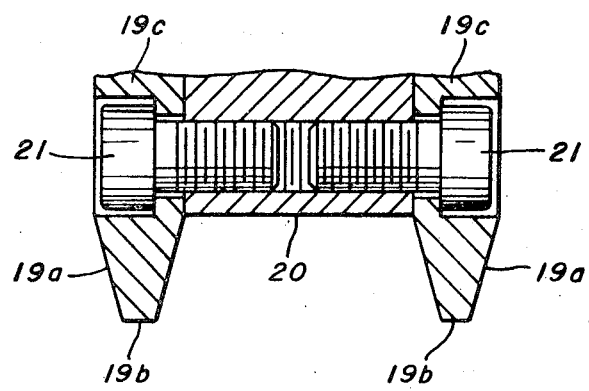
FIG. 3 shows in cross-section a modified form of the spring loaded seal mounted upon said grates.

A modified form of seal is shown in FIG. 3 of the drawing wherein the slide bars 19a are provided with a reduced bottom bearing face 19b. Such a seal provides for retention of air from the windboxes 2 but reduces the area frictional engagement between seal bar 16 and bearing surfaces 19b.

Referring now to FIGS. 1 and 2 or 3 of the drawing, it will be apparent that the weight of the grates and the loading therein are supported by wheels 15 moving over rails 4. Thus the seal bars 19 or 19a, FIGS. 2 and 3, moving over the slide rails 16 carry none of the load of the grates and are maintained in contact with slide rails 16, solely by the compression in springs 23. Thus air and combustion gases drawn downwardly through gates 5 will pass through wind box 2 and be restrained from escaping through the seals formed upon wind box rail faces 1a. Frictional engagement between sealing bars 16 and 19, or 19a, is limited to the compression in sealing bar springs 23. No lubrication is employed between sealing bars 16 and 19 or 19a. The use of two spaced sealing bars 19 assures maximum sealing with limited wear, since such bars 19 carry none of the load from the grate or its contents. Thus, the loading upon seal bars 19 or 19a is limited to compression in springs 23 and as the contacting faces of seal bars 19 worn by friction, the springs 23 maintain a constant seal. Since seal bars are not lubricated, collection of dust by excess lubrication is avoided.

I claim:

1. In a sintering apparatus having an open top windbox structure with generally parallel longitudinally extending sidewalls and at least one pallet movable over the windbox and supported for such movement by wheels engaging rails spaced laterally outwardly of the windbox, the top surfaces of said spaced rails lying generally in a common plane, the improvement therewith comprising:

sealing means on said pallet for sealing the spaces between the lateral edges of the sidewalls of the pallet and the windbox, said sealing means including:
 a. elongated seal bar means mounted at the lower portions of each of the sidewalls of the pallet for sliding bearing engagement with the opposed top surfaces of the lateral edges of the windbox during the movement of the pallet over the windbox, with the lower surfaces of the spaced seal bar means being generally in a common plane disposed above the plane of the top surfaces of the spaced rails, whereby all of the weight of the pallet is borne by the wheels of the pallet and supported on the rails; wherein said seal bar means are received within a longitudinally extending, downwardly opened housing attachably mounted within each of the sidewalls of the pallet, and said seal bar means are suspended from said pallet said seal bar means including a pair of spaced longitudinally extending vertically disposed sealing members spaced adjacent their top portions by a longitudinally extending spacing member and secured together by counter sunk bores whose end portions are recessed into the outer side faces of said sealng members; and b. biasing means between the pallet and said seal bar means for urging said seal bar means into sealing engagement with the opposed top surfaces of the lateral edges of the windbox, whereby all the force for effecting the sealing by said seal bars is provided by said biasing means.

* * * * *